US012360493B2

(12) United States Patent
Shimizu et al.

(10) Patent No.: US 12,360,493 B2
(45) Date of Patent: Jul. 15, 2025

(54) DEVELOPING CARTRIDGE

(71) Applicant: BROTHER KOGYO KABUSHIKI KAISHA, Nagoya (JP)

(72) Inventors: Keita Shimizu, Nagoya (JP); Haruka Kizu, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/640,847

(22) Filed: Apr. 19, 2024

(65) Prior Publication Data

US 2024/0264563 A1 Aug. 8, 2024

Related U.S. Application Data

(63) Continuation of application No. 18/192,041, filed on Mar. 29, 2023, now Pat. No. 11,982,973.

(30) Foreign Application Priority Data

Jul. 15, 2022 (JP) ................................ 2022-114289
Dec. 7, 2022 (JP) ................................ 2022-195455

(51) Int. Cl.
*G03G 21/18* (2006.01)
*G03G 15/08* (2006.01)
*G03G 21/16* (2006.01)

(52) U.S. Cl.
CPC ..... *G03G 21/1885* (2013.01); *G03G 15/0863* (2013.01); *G03G 21/1647* (2013.01); *G03G 21/1875* (2013.01); *G03G 21/1878* (2013.01); *G03G 15/0813* (2013.01); *G03G 15/0818* (2013.01)

(58) Field of Classification Search
CPC ........... G03G 15/0818; G03G 15/0813; G03G 15/0863; G03G 21/1647; G03G 21/1875; G03G 21/1878; G03G 21/1885
See application file for complete search history.

(56) References Cited

U.S. PATENT DOCUMENTS 10,025,264 B1 7/2018 Itabashi
2011/0069991 A1 3/2011 Lee et al.
2017/0184998 A1 6/2017 Itabashi
(Continued)

FOREIGN PATENT DOCUMENTS

EP 3889687 A1 10/2021
JP 2021-162749 A 10/2021

OTHER PUBLICATIONS

Extended European Search Report issued in corresponding European application No. 23185255.9, Dec. 8, 2023.

*Primary Examiner* — Joseph S Wong
(74) *Attorney, Agent, or Firm* — Merchant & Gould P.C.

(57) ABSTRACT

A developing cartridge includes a housing, a storage medium having an electrical contact surface, a holder holding the electrical contact surface and movable with respect to the housing between a first position and a second position, and a roller including a first roller protrusion. The first roller protrusion is movable between a third position and a fourth position in accordance with rotation of the roller. The holder is movable in accordance with movement of the first roller protrusion. As the first roller protrusion moves from the third position to the fourth position, the holder moves from the first position to the second position.

12 Claims, 5 Drawing Sheets

(56) References Cited

U.S. PATENT DOCUMENTS

| | | | | |
|---|---|---|---|---|
| 2017/0248906 | A1* | 8/2017 | Tanabe | G03G 21/18 |
| 2020/0310288 | A1* | 10/2020 | Itabashi | G03G 21/1676 |
| 2021/0311410 | A1 | 10/2021 | Kusuda et al. | |
| 2022/0075312 | A1* | 3/2022 | Ozaki | G03G 21/186 |

* cited by examiner

DEVELOPING CARTRIDGE

REFERENCE TO RELATED APPLICATIONS

This application is a continuation of U.S. patent application Ser. No. 18/192,041, filed Mar. 29, 2023, which claims priority from Japanese Patent Application No. 2022-195455 filed on Dec. 7, 2022, and from Japanese Patent Application No. 2022-114289 filed on Jul. 15, 2022. The entire contents of the aforementioned applications are incorporated herein by reference.

BACKGROUND ART

A known developing cartridge includes a storage medium, a holder, a holder cover, a gear cover, and a casing. The storage medium is held by the holder. The holder is held by the holder cover. The holder is movable with respect to the holder cover. The holder cover is fixed to the casing via the gear cover. The gear cover covers the gear. The casing is configured to store developer.

The holder includes a first member, a second member, and an elastic member. The elastic member is disposed between the first member and the second member. The holder is extendable and contractible by the elastic member. In a process of attaching the developing cartridge to an image forming apparatus, the holder is extended by the elastic member, so that an electrical contact surface of the developing cartridge is brought into contact with a main assembly electrical contact of the image forming apparatus.

DESCRIPTION

To reduce rubbing of the electrical contact surface of a developing cartridge against the main body electrical contact of the image forming apparatus, a method different from a conventional technique has been awaited.

An object of the disclosure is to reduce rubbing the electrical contact surface of the developing cartridge against the image forming apparatus.

According to an aspect of the present disclosure, a developing cartridge includes a housing, a developing roller, a storage medium, a holder, and a roller. The housing accommodates a developer. The developing roller is rotatable about a first axis extending in a first direction. The developing roller is located at one end portion of the housing in a second direction intersecting the first direction. The storage medium has an electrical contact surface. The holder is located at one end portion of the housing in the first direction. The holder holds the electrical contact surface. The holder is movable with respect to the housing between a first position and a second position different from the first position in a third direction intersecting the electrical contact surface. The roller is rotatable about a second axis extending in the first direction. The roller includes a first roller protrusion extending in the first direction. The first roller protrusion is contactable with the holder. The first roller protrusion is movable between a third position and a fourth position in accordance with rotation of the roller. The holder is movable in accordance with the movement of the first roller protrusion. As the first roller protrusion moves from the third position to the fourth position, the holder moves from the first position to the second position.

According to the developing cartridge of the first aspect, since the holder moves from the first position to the second position by the first roller protrusion of the roller moving from the third position to the fourth position, the movement of the electrical contact surface can be controlled by the rotation of the roller. This can reduce rubbing the electrical contact surface against the main assembly electrical contact of the image forming apparatus.

Figure 1:
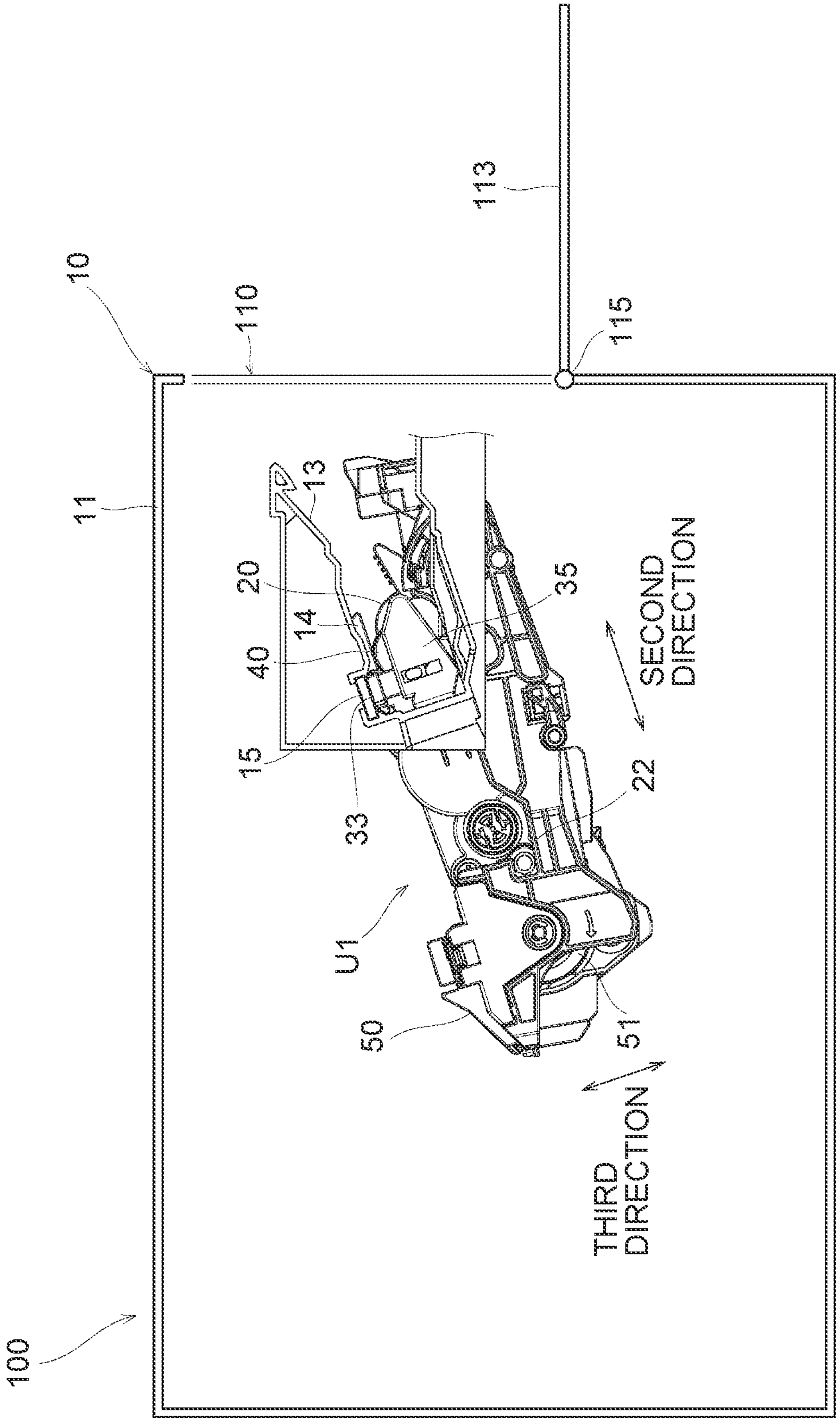
FIG. 1 is a schematic overall view of an image forming apparatus according to an embodiment.

Hereinafter, embodiments of the present disclosure will be described with reference to the accompanying drawings. Note that components described in this embodiment are merely examples, and the scope of the present disclosure is not intended to be limited only to them. In the drawings, for ease of understanding, parts may be illustrated as simplified in size and number.

1. EMBODIMENT

As illustrated in FIG. 1, an image forming apparatus 100 according to an embodiment is an apparatus that forms an image on a print medium such as a print sheet. The image forming apparatus 100 includes an apparatus main body 10. A process unit U1 is attachable to the apparatus main body 10. The process unit U1 includes a developing cartridge 20 and a drum cartridge 50. The developing cartridge 20 is attachable to the drum cartridge 50.

In the following description, a direction in which a rotation axis, which is a developing roller axis A22 of a developing roller 22 in the developing cartridge 20, extends is referred to as a "first direction". A direction in which the developing roller 22 and a handle 213 are arranged is referred to as a "second direction". A direction intersecting an electrical contact surface 33 of the developing cartridge 20 will be referred to as a "third direction". The first direction crosses the second direction and is preferably orthogonal to the second direction. The second direction crosses the third direction and is preferably orthogonal to the third direction.

The apparatus main body 10 includes a box-shaped main body frame 11. The main body frame 11 has an opening 110. The opening 110 is located at an end portion of the main body frame 11 in the second direction. The main body frame 11 includes a main body cover 113. The main body cover 113 is located at an end portion of the main body frame 11 in the second direction. The main body frame 11 includes a hinge 115. The hinge 115 is located at an end portion of the main body cover 113 in the third direction. The main body cover 113 is movable about the hinge 115 between a closed position for closing the opening 110 and an open position for opening the opening 110. The process unit U1 is attachable to the main body frame 11 in a state where the main body cover 113 is at the open position and the opening 110 is open.

The main body frame 11 includes a guide frame 13. The guide frame 13 has a main body electrical contact 15. When the process unit U1 is attached to the image forming apparatus 100, the guide frame 13 comes into contact with a holder 34 of the developing cartridge 20. The guide frame 13 guides the holder 34 so that the holder 34 moves along a predetermined path. In a state where the process unit U1 is attached to the main body frame 11, the main body electrical contact 15 is in contact with the electrical contact surface 33 of the developing cartridges 20. The main body electrical contact 15 is electrically connected to a main body controller of the image forming apparatus 100. When the main body electrical contact 15 is in contact with the electrical contact surface 33, the main body controller can read information from a development memory 31 of the developing cartridge 20 and write information to the development memory 31.

Developing Cartridge 20

Figure 2:
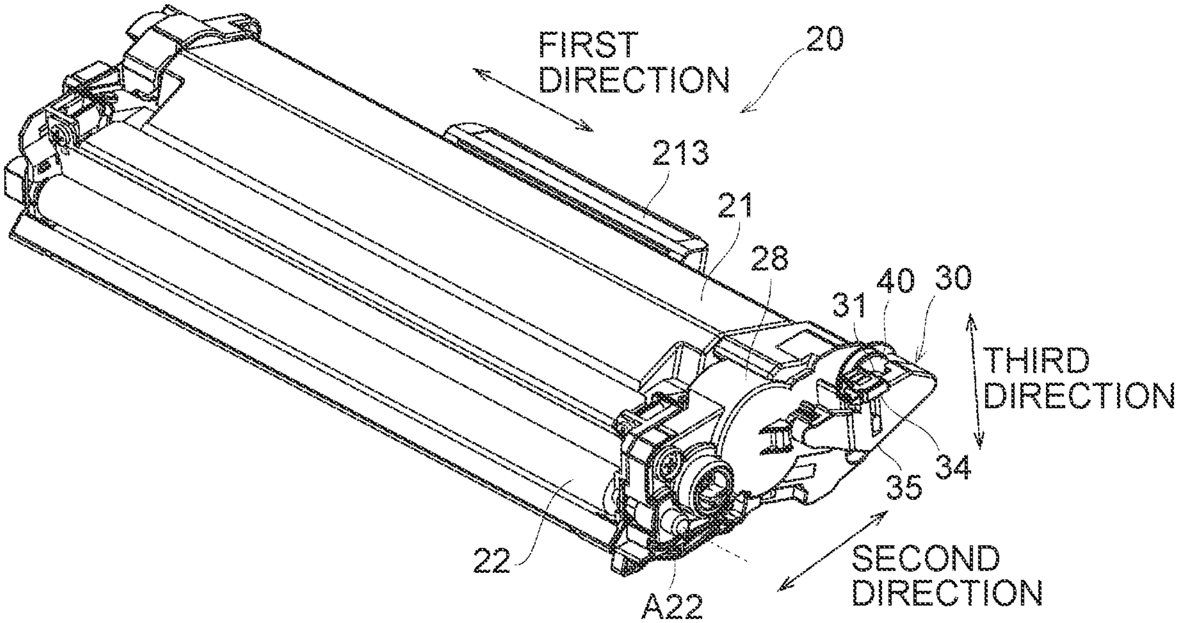
FIG. 2 is a perspective view of a developing cartridge according to the embodiment.

As illustrated in FIG. 2, the developing cartridge 20 includes a casing 21 and a developing roller 22. The casing 21 is configured to accommodate the developer. The developer is, for example, toner. The casing 21 extends in the first direction. The casing 21 has a handle 213. The developing roller 22 is located at one end portion of the casing 21 in the second direction. The handle 213 is located at the other end portion of the casing 21 in the second direction. The casing 21 is an example of a "housing".

The developing roller 22 is rotatable about a developing roller axis A22 extending in the first direction in a state where the developing cartridge 20 is attached to the image forming apparatus 100. The developing roller axis A22 is an example of a "first axis". In a state where the developing cartridge 20 is attached to the image forming apparatus 100, the developing roller 22 supplies the developer in the casing 21 to a surface of a photosensitive drum 51 of the drum cartridge 50.

Gear Cover 28

The developing cartridge 20 includes a gear cover 28. The gear cover 28 is positioned at one end portion of the casing 21 in the first direction. The gear cover 28 is fixed to one end portion of the casing 21 in the first direction. The gear cover 28 covers a gear of the developing cartridge 20.

Development Memory Unit 30

Figure 3:
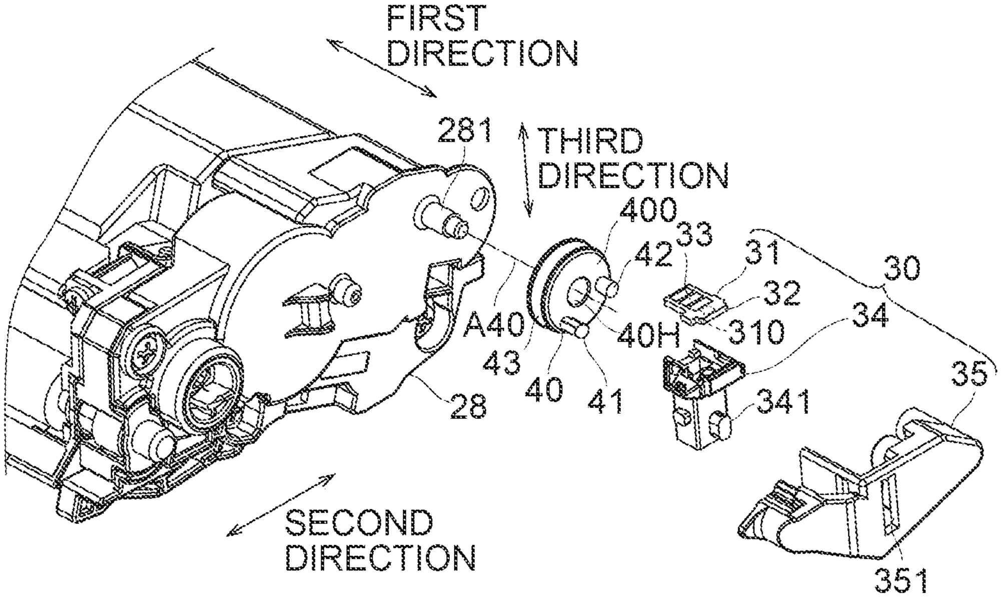
FIG. 3 is an exploded perspective view illustrating one end portion of the developing cartridge in a first direction.

The developing cartridge 20 includes a development memory unit 30. As illustrated in FIG. 3, the development memory unit 30 includes a development memory 31, a holder 34, and a holder cover 35. The development memory unit 30 is positioned at one end portion of the gear cover 28 in the first direction.

Development Memory 31

The development memory 31 stores various kinds of information related to the developing cartridge 20. The development memory 31 stores, for example, identification information and lifetime information. The identification information is information for identifying the developing cartridge 20, and is, for example, its serial number. The life information includes, for example, a cumulative number of rotations obtained by accumulating the number of rotations of the developing roller 22, a cumulative number of printed pages obtained by accumulating the number of printed sheets using the developing roller 22, and a cumulative number of dots obtained by accumulating the number of dots printed on sheets using the developing roller 22. In other words, the cumulative number of rotations is a cumulative value of the number of rotations of the developing roller 22 from a brand-new condition. The development memory 31 is an example of a "storage medium".

The development memory 31 includes a development substrate 32, an electrical contact surface 33, and a storage element 310. The development substrate 32 is a plate-like member. The electrical contact surface 33 is located at one end portion of the development substrate 32 in the third direction. The electrical contact surface 33 is electrically connected to the storage element 310. As illustrated in FIG. 1, in a state where the developing cartridge 20 is attached to the main body frame 11, the electrical contact surface 33 intersects the third direction. The electrical contact surface 33 is movable relative to the casing 21 at least in the third direction.

Holder 34

The holder 34 is located at one end portion of the casing 21 in the first direction. The holder 34 is between the developing roller 22 and the handle 213 in the second direction. The holder 34 holds the electrical contact surface 33 by holding the development substrate 32 of the development memory 31. The developing memory 31 is located at one end portion of the holder 34 in the third direction.

Figure 4:
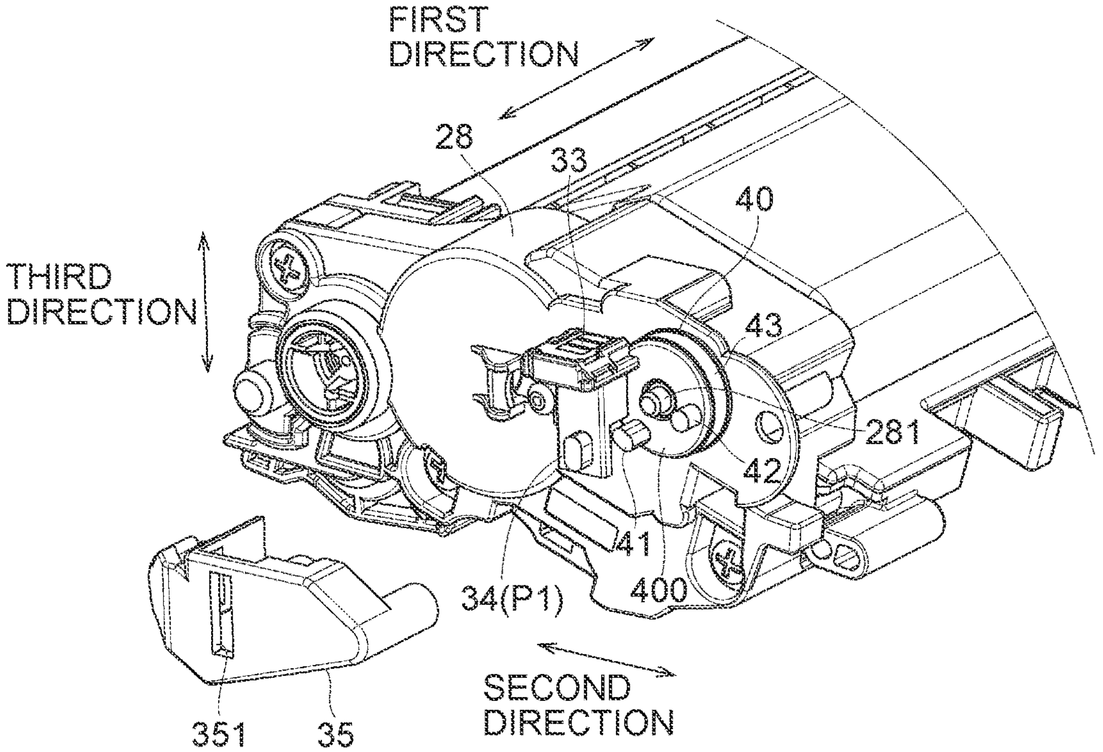
FIG. 4 is a perspective view illustrating one end portion of the developing cartridge.
Figure 5:
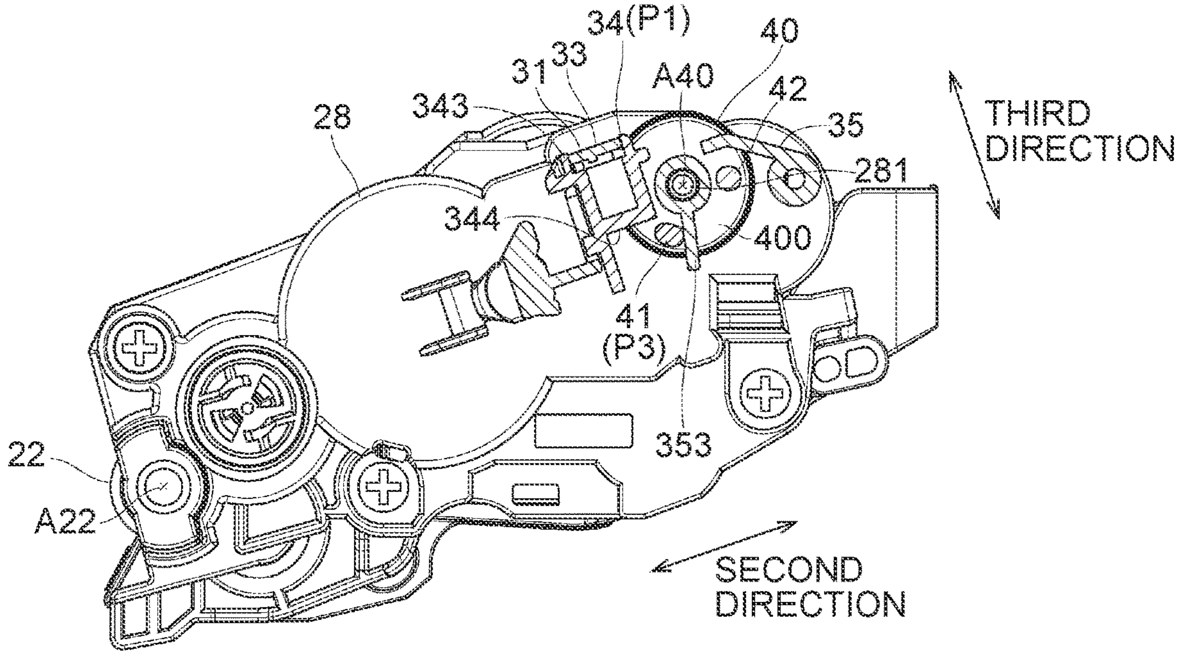
FIG. 5 is a side view illustrating one end portion of the developing cartridge in the first direction.
Figure 6:
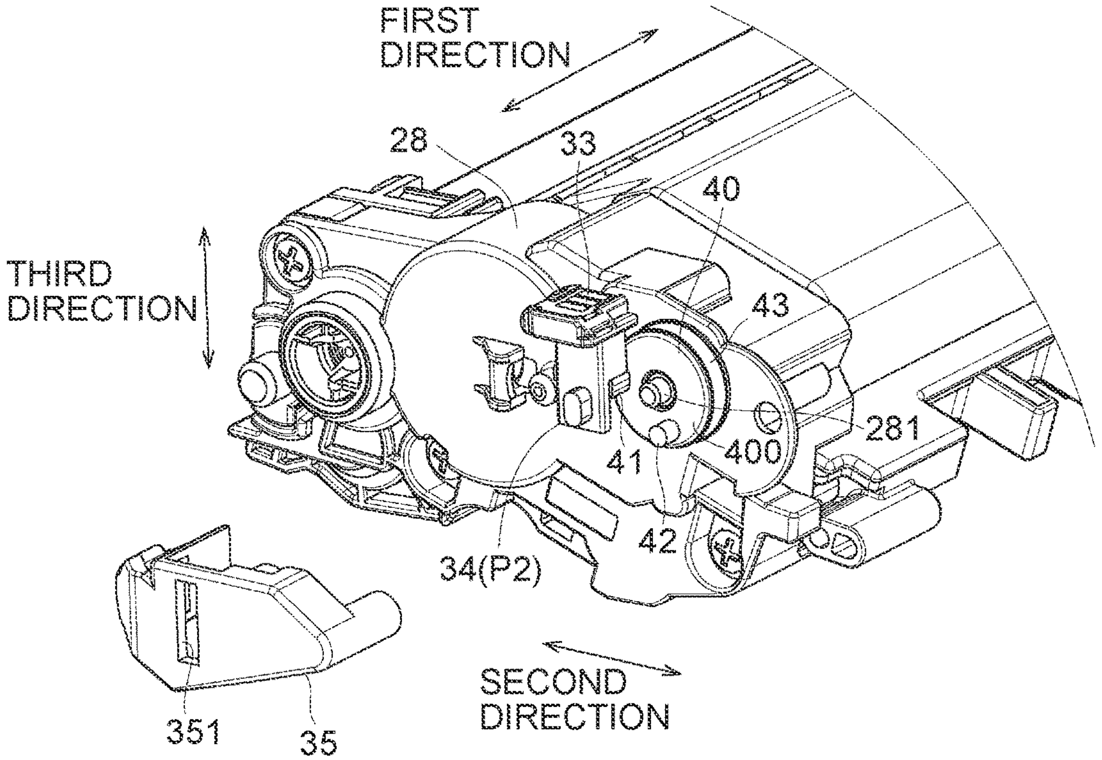
FIG. 6 is a perspective view illustrating one end portion of the developing cartridge.
Figure 7:
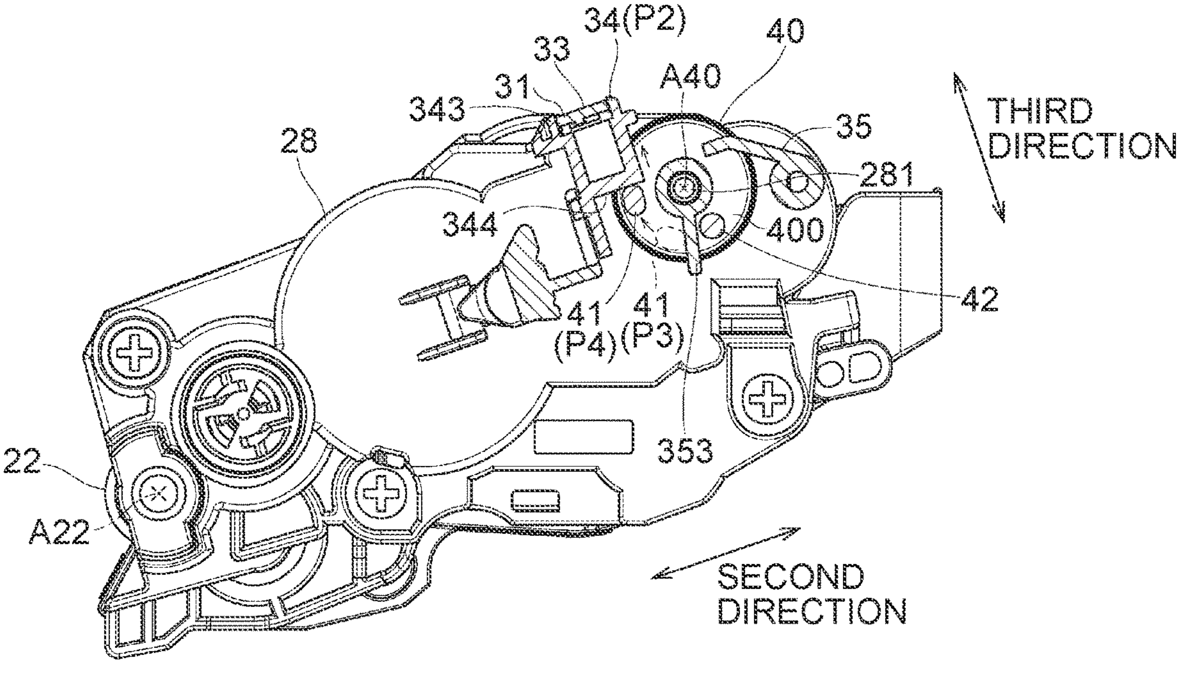
FIG. 7 is a side view illustrating one end portion of the developing cartridge in the first direction.

FIGS. 4 and 6 illustrate the developing cartridge 20 and the holder cover 35 removed from the developing cartridge. FIGS. 5 and 7 are cross-sectional views of the developing cartridge 20 which the holder cover 35 is removed, taken along a plane perpendicular to the first direction.

The holder 34 is movable with respect to the casing 21 and the gear cover 28 between a first position P1 illustrated in FIGS. 4 and 5 and a second position P2 illustrated in FIGS. 6 and 7. In the third direction, the second position P2 is different from the first position P1. In the process of attaching the process unit U1 to the image forming apparatus 100, the holder 34 is disposed at the first position P1 by own weights of the holder 34 and the developing memory 31. In the present embodiment, the first position P1 is downwardly away from the second position P2.

The holder 34 includes a holder protrusion 341 extending in the first direction. The holder protrusion 341 is located at one end portion of the holder 34 in the first direction.

Holder Cover 35

The holder cover 35 is located at one end portion of the gear cover 28 in the first direction. The holder cover 35 is fixed to the gear cover 28 by screws. The holder cover 35 holds the holder 34 to be movable between the first position P1 and the second position P2.

While the first roller protrusion 41 moves from the third position P3 to the fourth position P4, the holder 34 moves from the first position P1 to the second position P2 such that the electrical contact surface 33 moves away from the holder cover 35.

The holder cover 35 has a groove 351. The groove 351 includes a through-hole that passes through the holder cover 35 in the first direction. The groove 351 extends in the third direction. The length of the holder protrusion 341 in the second direction is less than the length of the groove 351 in the second direction. The holder protrusion 341 is inserted into the groove 351 such that there is play between the holder protrusion 341 and the groove 351 in the second direction. Therefore, the holder protrusion 341 is movable in the third direction with respect to the holder cover 35. When the holder 34 moves in the third direction with respect to the holder cover 35, the holder protrusion 341 moves in the third direction inside the groove 351. The holder protrusion 341 inserted into the groove 351 regulates the direction of movement of the holder 34.

Roller 40

The developing cartridge 20 includes a roller 40. The roller 40 is located at one end portion of the gear cover 28 in the first direction. The roller 40 is rotatable with respect to the casing 21 and the gear cover 28 about a roller axis A40 extending in the first direction. The roller axis A40 is an example of a second axis. The roller 40 includes a circular plate having a thickness in the first direction. The roller 40 may have a shape different from a circular shape, such as an elliptical shape or a fan shape. The roller 40 is an example of a "roller".

As illustrated in FIG. 2, the roller 40 is between the gear cover 28 and the holder 34 in the first direction. The holder cover 35 covers at least a part of the roller 40. Therefore, the holder cover 35 protects the roller 40.

The gear cover 28 holds the roller 40 to be rotatable about the roller axis A40. The gear cover 28 has a gear cover protrusion 281. The gear cover protrusion 281 is located at one end portion of the gear cover 28 in the first direction. The gear cover protrusion 281 extends in the first direction. As illustrated in FIG. 3, the roller 40 has an insertion hole 40H that passes through the roller 40 in the first direction. The gear cover protrusion 281 is inserted into the insertion hole 40H. The roller 40 is rotatable about the gear cover protrusion 281. The gear cover protrusion 281 overlaps with the roller axis A40 in the first direction. The roller 40 rotates about the gear cover protrusion 281.

As illustrated in FIG. 3, the roller 40 includes a first roller protrusion 41 and a second roller protrusion 42. The first roller protrusion 41 and the second roller protrusion 42 are located at one end portion of the roller 40 in the first direction.

The first roller protrusion 41 extends in the first direction. The first roller protrusion 41 is contactable with the holder 34. As the roller 40 rotates, the first roller protrusion 41 moves between a third position P3 illustrated in FIGS. 4 and 5 and a fourth position P4 illustrated in FIGS. 6 and 7. The holder 34 is movable along with the movement of the first roller protrusion 41. When the first roller protrusion 41 moves from the third position P3 to the fourth position P4, the holder 34 moves from the first position P1 to the second position P2. In the present embodiment, as the first roller protrusion 41 moves from the third position P3 to the fourth position P4, the first roller protrusion 41 lifts the holder 34 from the first position P1 to the second position P2. In other words, the second position P2 is vertically upwardly away from the first position P1.

As illustrated in FIGS. 5 and 7, the holder 34 has a first end portion 343 and a second end portion 344. The first end portion 343 holds the electrical contact surface 33. The second end portion 344 is located closer to the developing roller 22 than the electrical contact surface 33 in the third direction. As illustrated in FIG. 5, when the first roller protrusion 41 is located at the third position P3, the first roller protrusion 41 is away from the second end portion 344. As illustrated in FIG. 7, when the first roller protrusion 41 is located at the fourth position P4, the first roller protrusion 41 is in contact with the second end portion 344.

As illustrated in FIGS. 5 and 7, the holder cover 35 has a cover protrusion 353. The cover protrusion 353 extends in a direction intersecting the first direction. As illustrated in FIGS. 5 and 7, the cover protrusion 353 extends in the third direction. As illustrated in FIGS. 5 and 7, the cover protrusion 353 is between the first roller protrusion 41 and the second roller protrusion 42 in the second direction.

As illustrated in FIG. 5, when the first roller protrusion 41 is located at the third position P3, the first roller protrusion 41 is in contact with the cover protrusion 353. As illustrated in FIG. 7, when the first roller protrusion 41 is located at the fourth position P4, the first roller protrusion 41 is away from the cover protrusion 353. The cover protrusion 353 is an example of a "first protrusion".

As illustrated in FIG. 5, when the first roller protrusion 41 is located at the third position P3, the second roller protrusion 42 is away from the cover protrusion 353. As illustrated in FIG. 7, when the first roller protrusion 41 is located at the fourth position P4, the second roller protrusion 42 is in contact with the cover protrusion 353. Thus, rotation of the first roller protrusion 41 is regulated.

As illustrated in FIG. 3, the roller 40 includes a rubber 43 and a roller body 400. The rubber 43 is located on the outer peripheral surface of the roller body 400. The roller body 400 is made of, for example, resin. The outer peripheral surface of the roller body 400 is recessed in a direction approaching the roller axis A40 in the radial direction. The radial direction is a direction orthogonal to the roller axis A40. The rubber 43 is fitted into the recessed outer peripheral surface of the roller body 400. The rubber 43 has, for example, an annular shape. The rubber 43 together with the roller body 400 is rotatable about the roller axis A40.

Description about Attaching

Figure 8:
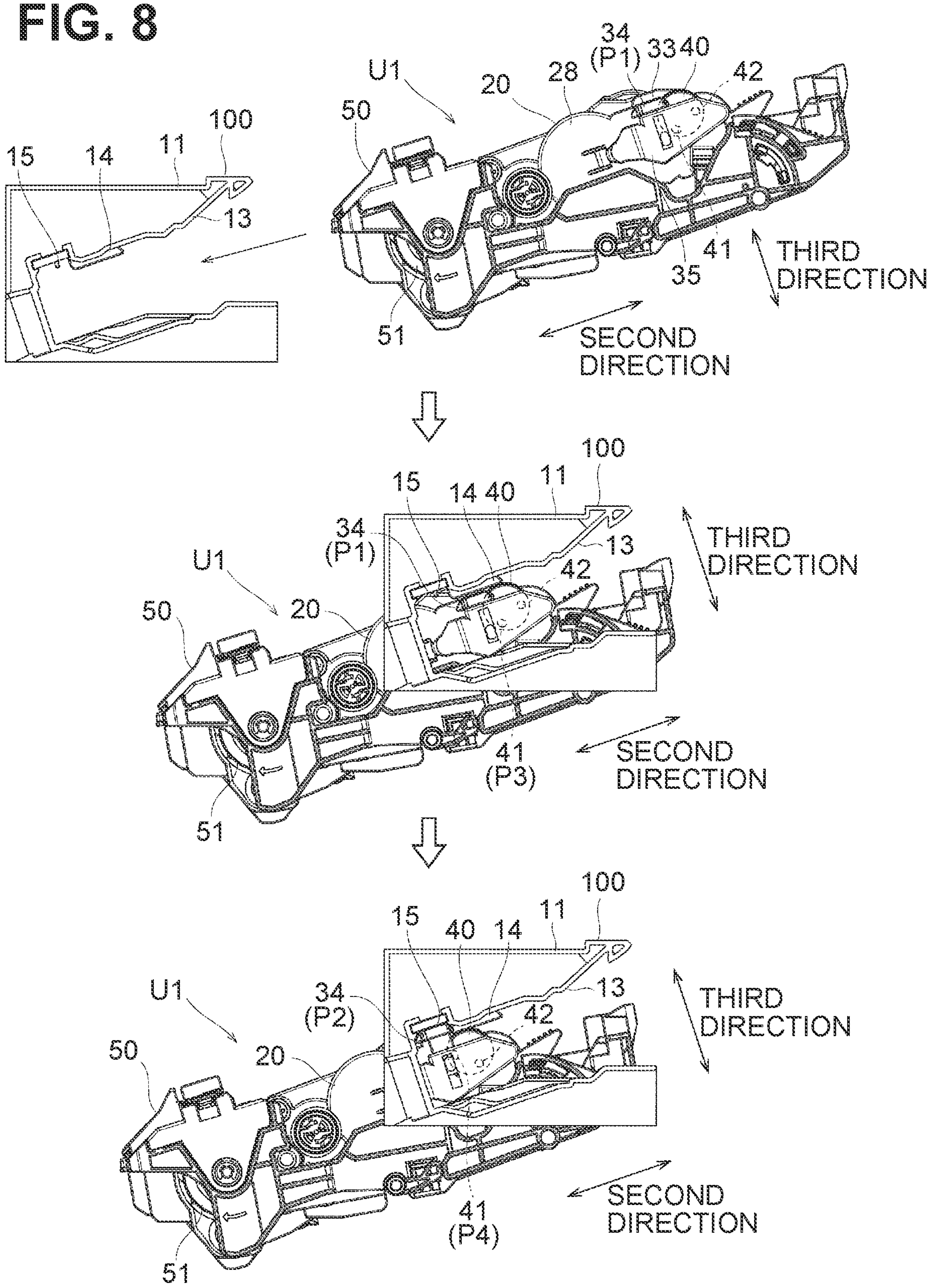
FIG. 8 is a side view illustrating how the process unit is attached to the main body frame of the image forming apparatus.

FIG. 8 is a side view illustrating how the process unit U1 is attached to the image forming apparatus 100. In FIG. 8, only a part of a main body frame 11 of the image forming apparatus 100 is illustrated. As illustrated in FIG. 8, the process unit U1 is inserted into the main body frame 11 in the second direction.

The main body frame 11 has a frame protrusion 14. The frame protrusion 14 extends in the second direction. The frame protrusion 14 protrudes from the guide frame 13 in the third direction. The thickness of the frame protrusion 14 in the first direction is less than the thickness of the roller 40 in the first direction. In the process of inserting the process unit U1 into the main body frame 11, the rubber 43 on the outer peripheral surface of the roller 40 comes into contact with the frame protrusion 14.

When the process unit U1 is further inserted into the main body frame 11 with the rubber 43 of the roller 40 in contact with the frame protrusion 14, the roller 40 rotates while the rubber 43 is in contact with the frame protrusion 14. At this moment, the rubber 43 is elastically deformed such that a frictional force between the rubber 43 of the roller 40 and the frame protrusion 14 causes the roller 40 to properly rotate.

When the roller 40 starts to rotate with the first roller protrusion 41 of the roller 40 at the third position P3 (refer to FIG. 5), the first roller protrusion 41 starts to move toward the fourth position P4 (refer to FIG. 7). Before the first roller protrusion 41 reaches the fourth position P4, the first roller protrusion 41 comes into contact with the holder 34. Hereinafter, the position of the first roller protrusion 41 when the first roller protrusion 41 comes into contact with the holder 34 is referred to as a "contact position". In a process in which the first roller protrusion 41 rotates from the contact position toward the fourth position P4, the first roller protrusion 41 pushes the holder 34 toward one side in the third direction. As a result, the holder 34 starts to move from the first position P1 toward the second position P2. Further, in a state where the first roller protrusion 41 reaches the fourth position P4, the holder 34 reaches the second position P2.

When the holder 34 is located at the second position P2, the electrical contact surface 33 of the development memory 31 held by the holder 34 is in contact with the main body electrical contact 15 of the image forming apparatus 100. Thus, the development memory 31 and the main body controller of the image forming apparatus 100 are electrically connected to each other. When the holder 34 is located at the second position P2, the first roller protrusion 41 of the roller 40 pushes the holder 34 in the third direction, so that the electrical contact surface 33 is pressed against the main assembly electrical contacts 15. Thus, the electrical contact surface 33 remains in stable contact with the main body electrical contact 15.

According to the developing cartridge 20, as the first roller protrusion 41 of the roller 40 rotates from the third position P3 to the fourth position P4, the holder 34 moves from the first position P1 to the second position P2. This movement of the holder 34 causes the electrical contact surface 33 of the development memory 31 to move in the third direction.

The electrical contact surface 33 moves in the third direction and comes into contact with the main body electrical contact 15. Therefore, rubbing the electrical contact surface 33 against the main body electrical contact 15 can be reduced as compared with the case where the electrical contact surface 33 comes into contact with the main body electrical contact 15 without moving in the third direction.

While the first roller protrusion 41 moves from the third position P3 to the fourth position P4 due to the rotation of the roller 40, the first roller protrusion 41 lifts the holder 34 from the first position P1 to the second position P2. As a result, the electrical contact surface 33 of the development memory 31 can be lifted without another device, such as a spring, which would be incorporated into the holder.

The first roller protrusion 41 of the roller 40 lifts the holder 34 to bring the electrical contact surface 33 of the development memory 31 into contact with the main body electrical contact 15. As a result, in the process of attaching the process unit U1 to the image forming apparatus 100, the interference of the development memory 31 with the guide frame 13 and other portions located in front of the main body electrical contact 15 may be prevented, thereby the operation load for attaching the process unit U1 to the image forming apparatus may be decreased.

Since the rubber 43 is elastically deformed, the friction between the rubber 43 and the frame protrusion 14 can be increased. Thus, the roller 40 can be rotated. In addition, since the rubber 43 is elastically deformed, the force with which the first roller protrusion 41 lifts the holder 34 can be adjusted to an appropriate magnitude. Thus, the electrical contact surface 33 can be brought into contact with the main body electrical contact 15 with an appropriate force.

The roller 40 is rotatably held by the gear cover protrusion 281. When the process unit U1 is attached to the image forming apparatus 100, the first roller protrusion 41 of the roller 40 comes into contact with the cover protrusion 353 due to the own weight of the roller 40. The first roller protrusion 41 can be thus stably at the third position P3.

Further, before the process unit U1 is attached to the image forming apparatus 100, the first roller protrusion 41 is at the third position P3. The movement amount of the first roller protrusion 41 during attachment can be thus maintained constant. Even when the process unit U1 is attached and detached many times, the electrical contact surface 33 can be appropriately brought into contact with the main body electrical contact 15 every time.

In the process of detaching the process unit U1 from the image forming apparatus 100, the first roller protrusion 41 moves down by the reverse rotation of the roller 40. As a result, the electrical contact surface 33 of the development memory 31 is separated from the main body electrical contact 15 by the weight of the development memory 31 and the holder 34.

Preferably, the weight of the first roller protrusion 41 is greater than the weight of the second roller protrusion 42. By making the weight of the first roller protrusion 41 greater than the weight of the second roller protrusion 42, the second roller protrusion 42 can be away from the cover protrusion 353 while the first roller protrusion 41 is in contact with the cover protrusion 353. In order to make the weight of the first roller protrusion 41 greater than the weight of the second roller protrusion 42, the volume of the first roller protrusion 41 may be greater than the volume of the second roller protrusion 42. In order to make the volume of the first roller protrusion 41 greater than the volume of the second roller protrusion 42, as illustrated in FIG. 5, the cross-sectional area of the first roller protrusion 41 may be greater than the cross-sectional area of the second roller protrusion 42. In addition, the length of the first roller protrusion 41 may be greater than the length of the second roller protrusion 42 in the first direction.

2. MODIFICATIONS

Although the present disclosure has been described with reference to the specific embodiment thereof, the present disclosure may not be limited to the above-described embodiment, and various modifications may be applied.

The roller 40 may not have the rubber 43 on its outer peripheral surface. For example, the roller 40 may include a fiber member having a large frictional force, instead of the rubber 43. Alternatively, the roller body 400 made of resin may be brought into direct contact with the guide frame 13 to rotate the roller 40 by the frictional force between the roller body 400 itself and the guide frame 13.

The groove 351 may not be a through hole but may be a recess into which the end portion of the holder protrusion 341 can be inserted.

It may not be essential that the cover protrusion 353 is a part of the holder cover 35. For example, the cover protrusion 353 may be a part of the gear cover 28. Further, the cover protrusion 353 may be a member fixed to the gear cover protrusion 281.

In the above-described embodiment, the development memory 31 having the electrical contact surface 33 is held on the outer surface of the holder 34. However, the electrical contact surface 33 may be held on the outer surface of the holder 34, and the storage element 310 may be disposed at another position of the developing cartridge 20.

In the embodiment described above, the second position P2 is a position away from the first position P1 in the vertically upward direction. However, the second position P2 may be a position away vertically downward from the first position P1. Further, the second position P2 may be the same position as the first position P1 in the vertical direction and may be a position horizontally away from the first position P1. Further, the second position P2 may be a position horizontally and vertically away from the first position P1.

Although the present disclosure has been described in detail, the above description is illustrative in all aspects, and the present disclosure is not limited thereto. It is understood that numerous non-illustrated variations may be made without departing from the scope of this disclosure. The configurations described in the above embodiments and modifications may be combined or omitted as long as they do not contradict each other.

What is claimed is:

1. A developing cartridge comprising:

a housing configured to accommodate a developer;

a developing roller rotatable about a first axis extending in a first direction, the developing roller being at one end portion of the housing in a second direction intersecting the first direction;

a storage medium having an electrical contact surface;

a holder located at one end portion of the housing in the first direction, the holder holding the electrical contact surface, the holder being movable with respect to the housing between a first position and a second position different from the first position in a third direction intersecting the electrical contact surface; and a roller rotatable about a second axis extending in the first direction, the roller being at the one end portion of the housing in the first direction, wherein the holder is movable in accordance with movement of the roller.

2. The developing cartridge according to claim 1, wherein, as the roller rotates, the roller lifts the holder from the first position to the second position.

3. The developing cartridge according to claim 1, further comprising a holder cover configured to hold the holder to be movable between the first position and the second position, wherein, as the roller rotates, the holder moves from the first position to the second position such that the electrical contact surface moves away from the holder cover.

4. The developing cartridge according to claim 3, wherein the holder cover covers at least a part of the roller.

5. The developing cartridge according to claim 3, wherein the holder includes a holder protrusion extending in the first direction, and wherein the holder cover includes a groove, extending in the third direction, into which the holder protrusion is inserted.

6. The developing cartridge according to claim 1, wherein the roller includes:

a roller body; and a rubber located on an outer peripheral surface of the roller body.

7. The developing cartridge according to claim 1, wherein the holder further includes:

a first end portion holding the electrical contact surface; and a second end portion closer to the developing roller than the electrical contact surface in the third direction, and wherein, the roller is configured to be in contact with the second end portion.

8. The developing cartridge according to claim 1, further comprising a gear cover located at one end portion of the housing in the first direction, the gear cover holding the roller so as to be rotatable about the second axis.

9. The developing cartridge according to claim 8, wherein the gear cover includes a gear cover protrusion extending in the first direction and overlapping with the second axis, and wherein the roller has an insertion hole into which the gear cover protrusion is inserted.

10. The developing cartridge according to claim 8, wherein the roller is between the gear cover and the holder in the first direction.

11. The developing cartridge according to claim 1, further comprising a first protrusion extending in a direction intersecting the first direction, wherein the roller is rotatable between a first position which the roller is in contact with the first protrusion and a second position which the roller is in contact with the holder.

12. The developing cartridge according to claim 1, wherein the developing cartridge is attachable to an image forming apparatus, and wherein, in a process of attaching the developing cartridge to the image forming apparatus, the roller rotates while an outer circumferential surface of the roller is in contact with the image forming apparatus.

* * * * *